US010206163B2

United States Patent
Liu

(10) Patent No.: US 10,206,163 B2
(45) Date of Patent: Feb. 12, 2019

(54) NETWORK ACCESS METHOD AND MOBILE COMMUNICATIONS TERMINAL

(71) Applicant: GUANGDONG OPPO MOBILE TELECOMMUNICATIONS CORP., LTD., Dongguan, Guangdong (CN)

(72) Inventor: Hai Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 15/997,332

(22) Filed: Jun. 4, 2018

(65) Prior Publication Data

US 2018/0288689 A1 Oct. 4, 2018

Related U.S. Application Data

(63) Continuation of application No. 15/329,538, filed as application No. PCT/CN2016/077013 on Mar. 22, 2016.

(30) Foreign Application Priority Data

Apr. 30, 2015 (CN) .......................... 2015 1 0221196

(51) Int. Cl.
*H04W 48/16* (2009.01)
*H04W 48/08* (2009.01)
(Continued)

(52) U.S. Cl.
CPC .......... *H04W 48/16* (2013.01); *H04W 48/08* (2013.01); *H04W 48/18* (2013.01); *H04W 8/183* (2013.01)

(58) Field of Classification Search
CPC ..... H04W 48/02; H04W 48/04; H04W 48/08; H04W 48/10; H04W 48/16; H04W 48/18; H04W 8/18; H04W 8/183
See application file for complete search history.

(56) References Cited

U.S. PATENT DOCUMENTS

| 8,036,654 B2 * | 10/2011 | Hind ..................... H04W 48/18 |
| | | 455/432.1 |
| 9,125,146 B1 * | 9/2015 | Edara .................... H04W 48/16 |

(Continued)

FOREIGN PATENT DOCUMENTS

| CN | 101657005 A | 2/2010 |
| CN | 101674635 A | 3/2010 |

(Continued)

OTHER PUBLICATIONS

Equivalent PLMNs list handling in EPS. 3 GPP TSG CT WG1 Meeting #53, Cape Town, South Africa, May 2008.

*Primary Examiner* — Kevin D Mew
(74) *Attorney, Agent, or Firm* — Ladas & Parry LLP

(57) ABSTRACT

Disclosed are a network access method and a mobile communications terminal. The method comprises: determining a network standard supported by a mobile communications terminal; adding to an equivalent public land mobile network (EPLMN) the network identifier of a public land mobile network (PLMN) of the determined network standard supported by the mobile communications terminal; if a PLMN matching the network identifier of the EPLMN is discovered by searching, then establishing a communications connection between the mobile communications terminal and the matching PLMN.

4 Claims, 3 Drawing Sheets

(51) Int. Cl.
*H04W 48/18* (2009.01)
*H04W 8/18* (2009.01)

(56) References Cited

U.S. PATENT DOCUMENTS

| | | | |
|---|---|---|---|
| 9,730,157 B2* | 8/2017 | Puranik | H04W 52/0212 |
| 9,967,812 B2* | 5/2018 | Liu | H04W 48/16 |
| 2005/0107109 A1* | 5/2005 | Gunaratnam | H04W 28/12 |
| | | | 455/525 |
| 2012/0064883 A1 | 3/2012 | Kim | |
| 2012/0264425 A1* | 10/2012 | Krishnamoorthy | H04W 48/16 |
| | | | 455/434 |
| 2013/0136115 A1* | 5/2013 | Moisanen | H04W 76/18 |
| | | | 370/338 |
| 2013/0231105 A1* | 9/2013 | Bai | H04W 48/18 |
| | | | 455/426.1 |
| 2014/0128070 A1* | 5/2014 | Ni | H04W 48/16 |
| | | | 455/435.2 |
| 2014/0169244 A1* | 6/2014 | Polisetty | G06F 17/30864 |
| | | | 370/311 |
| 2014/0204903 A1* | 7/2014 | Kim | H04W 48/18 |
| | | | 370/331 |
| 2014/0235237 A1* | 8/2014 | Shin | H04W 48/16 |
| | | | 455/434 |
| 2014/0357285 A1* | 12/2014 | Smith | H04W 48/17 |
| | | | 455/450 |
| 2015/0056985 A1* | 2/2015 | Swaminathan | H04W 88/06 |
| | | | 455/432.1 |
| 2015/0072679 A1* | 3/2015 | Wirtanen | H04W 48/18 |
| | | | 455/434 |
| 2015/0208327 A1* | 7/2015 | Baratam | H04W 68/00 |
| | | | 455/432.1 |
| 2015/0312809 A1 | 10/2015 | Shu et al. | |
| 2015/0351013 A1* | 12/2015 | Zhang | H04W 4/021 |
| | | | 370/328 |
| 2017/0208537 A1* | 7/2017 | Cao | H04W 24/02 |
| 2017/0208538 A1* | 7/2017 | Cao | H04W 48/18 |
| 2017/0215134 A1* | 7/2017 | Liu | H04W 8/26 |
| 2017/0215136 A1 | 7/2017 | Liu | |
| 2017/0223618 A1* | 8/2017 | Liu | H04W 48/08 |
| 2017/0223619 A1* | 8/2017 | Cao | H04W 48/16 |
| 2017/0223620 A1* | 8/2017 | Liu | H04W 48/14 |
| 2017/0311237 A1 | 10/2017 | Cao | |

FOREIGN PATENT DOCUMENTS

| | | |
|---|---|---|
| CN | 104902541 A | 9/2015 |
| EP | 2945425 A1 | 11/2015 |
| EP | 3169109 A1 | 5/2017 |
| EP | 3188532 A1 | 7/2017 |
| WO | 2014107855 A1 | 7/2014 |
| WO | 2016173336 A1 | 11/2016 |
| WO | 2016202294 A1 | 12/2016 |

* cited by examiner

NETWORK ACCESS METHOD AND MOBILE COMMUNICATIONS TERMINAL

CROSS REFERENCE TO RELATED APPLICATION

This application is a continuation application of U.S. Ser. No. 15/329,538, filed on Jan. 26, 2017, which is application is a US national phase application based upon an International Application No. PCT/CN2016/077013, filed on Mar. 22, 2016, which claims priority to Chinese Application No. 201510221196.1, filed Apr. 30, 2015. The entire disclosures of each of the above applications are incorporated herein by reference.

BACKGROUND OF THE DISCLOSURE

1. Field of the Disclosure

The present disclosure relates to the field of mobile communication technology, and more particularly, to a method of accessing to networks and a mobile communication terminal.

2. Description of the Related Art

Public land mobile network (PLMN) is a network built and operated by the government or operators approved by the government for the purpose of providing land-bound mobile communication services for the public. The network is usually connected to public switched telephone network (PSTN), forming a communication network that covers a whole region or country.

A network identity of the PLMN is usually just a string of numbers. For example, the network identity of PLMN of China Mobile is 46000, and the network identity of PLMN of China Unicorn is 46001. Through the mobile networks provided by each operator, users can enjoy rapid and convenient communication. The number of users carrying communication terminals has been on the rise as people's living standard elevates. When a user inserts a new user identification card into a mobile communication terminal for the first time, the mobile communication terminal (e.g. a cell phone) must search a network to acquire the network identity of the PLMN. However, when the user inserts the new user identification card into the mobile communication terminal for the first time, it usually takes the terminal a long time (sometimes even as long as ten to twenty minutes) to search the network. And, only when the terminal successfully found the network can it connect to the PLMN of the current location. It significantly influences users' communication experience.

SUMMARY

The embodiment of the present disclosure provides a method and mobile communication terminal for accessing to a network and reducing the time needed to connect to a PLMN, thus greatly improves users' communication experience.

The present disclosure proposes a method for accessing to a network. The method includes follows.

A network standard supported by the mobile communication terminal is determined.

A network identity of a public land mobile networks (PLMN) in compliance with the determined network standard supported by the mobile communication terminal is added to an equivalent public land mobile network (EPLMN) list.

A communication connection between the mobile communication terminal and a matching PLMN is established upon a condition that the matching PLMN is found to match the network identity in the EPLMN list.

The present disclosure also proposes a mobile communication terminal. The mobile communication terminal includes a standard determining unit, an adding unit, and an accessing unit.

The standard determining unit is configured to determine a network standard supported by the mobile communication terminal.

The adding unit is configured to add a network identity of a public land mobile networks (PLMN) in compliance with the determined network standard supported by the mobile communication terminal to an equivalent public land mobile network (EPLMN) list.

The accessing unit is configured to achieve a communication connection between the mobile communication terminal and a matching PLMN upon a condition that the matching PLMN is found to match the network identity in the EPLMN list.

The embodiment of the present disclosure determines the standard supported by the mobile communication terminal, and adds the network identity of the determined standard PLMN supported by the mobile communication terminal into the EPLMN list. When a PLMN is found to match a network identity in the EPLMN list, a communication connection between the mobile communication terminal and the matching PLMN is established. The embodiment of the present disclosure adds the network identity of the determined standard PLMN supported by the mobile communication terminal into the EPLMN list. The EPLMN list stores network identities of PLMNs that are regarded as equivalent to a certain extent by the mobile communication terminal. Therefore, when the mobile communication terminal connects to a network based on the EPLMN list, which has stored network identities of standard PLMNs supported by the mobile communication terminal, it searches networks based on the current location when it is inserted with a user identification card for the first time. Thus it significantly heightens the chance of finding a PLMN whose network identity matches a network identity that is already stored in the EPLMN list during the process of network searching, as well as the possibility of the mobile communication terminal accessing to a network at the current location. It is instrumental in minimizing the waiting time when users are communicating (ideally, it only takes a few seconds for the mobile communication terminal to complete network connection), and thus is instrumental in greatly improving users' communication experience.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF PREFERRED EMBODIMENTS

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

The embodiment of the present disclosure proposes a method and mobile communication terminal for accessing to a network to reduce the time needed for the mobile communication terminal to connect to a PLMN, thus greatly improves users' communication experience.

Figure 1:
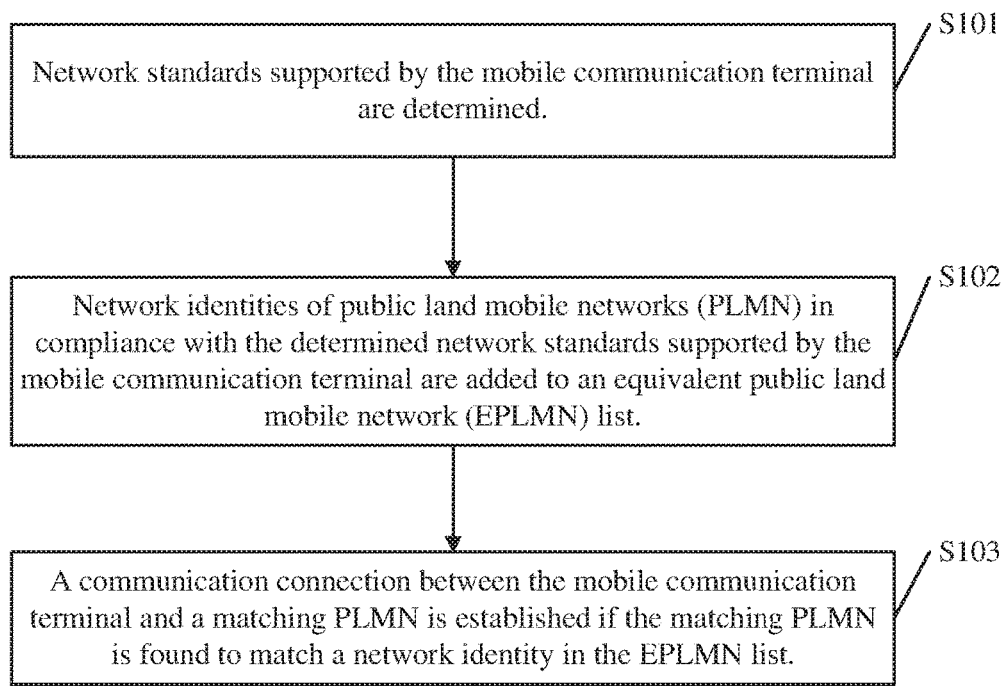
FIG. 1 is a flow chart of a method for accessing to a network according to an embodiment of the present disclosure.

Please refer to FIG. 1. FIG. 1 is a flow chart of the method for accessing to a network according to an embodiment of the present disclosure. It can be applied to mobile communication terminals such as smart phones (e.g. android phones, iOS phones, and so on). The method for accessing to a network includes following blocks:

S101: Network standards supported by the mobile communication terminal are determined.

In the embodiment of the present disclosure, network standards refer to the types of the networks. Types of network standards commonly seen in China are code division multiple access (CDMA), with mobile phones using CDMA 1× at frequency band 800 MHz; global system for mobile communication (GSM), with mobile phones using frequency bands 900/1800/1900 MHZ; GSM 1× dual-mode (i.e. wideband CDMA, WCDMA) in the recent years, taking frequency bands 900/1800 HMZ; 3G mobile communication technology, taking frequency bands 900/1800/1900/2100 HMZ; and 4G technology, taking frequency bands 1920-2170 MHZ.

In the embodiment of the present disclosure, the network standards that can be supported by each mobile communication terminal are limited and definite. That is, after a mobile communication terminal is produced, the network standards supported by the mobile communication terminal are determined.

S102: Network identities of public land mobile networks (PLMN) in compliance with the determined network standards supported by the mobile communication terminal are added to an equivalent public land mobile network (EPLMN) list.

In the embodiment of the present disclosure, Public Land Mobile Network (PLMN) is a network built and operated by the government or operators approved by the government for the purpose of providing land-bound mobile communication services to the public. The network is usually connected to PSTN, forming a communication network that covers a whole region or country. For example, the network identity of PLMN of China Mobile is 46000, and the network identity of China Unicom is 46001. PLMN is a wireless communication system, inclined to be accessed by land-bound users riding on transportation tools or moving on foot. Such a system can be independent, but it is usually connected to a landline telephone system, such as PSTN. However, there are also more and more mobile and portable Internet users. An ideal PLMN system provides services to mobile and portable users equivalent to that provides to landline users. It can be especially challenging in areas with complicated terrains, because it is difficult to find and maintain a base station. There are also many obstacles in an urban environment, such as noises and interfering radiation that can be evoked by buildings and radio frequencies.

In the embodiment of the present disclosure, an equivalent public land mobile network (EPLMN) is a PLMN that has the same status and level of priority as the PLMN currently chosen by the user's terminal. The EPLMN mainly solves problems related to user retention and roaming strategy in shared networks and original networks. Operators can deploy equivalent PLMNs so to realize sharing of communication network resources. From a business perspective, the practice realizes sharing of communication network resources among different PLMNs defined by the same operator or PLMNs of different operators.

In the embodiment of the present disclosure, the network identity of the PLMN can include network codes. For example, the network codes of China Mobile include: 46000, 46002, 46007, and 46008. The network codes of China Unicom include: 46001, 46006 and 46009.

Specifically, when the mobile communication terminal determines the network standard that can be supported by it, the network identity of the PLMN in compliance with the network standard can be added into the EPLMN list. For example, when the mobile communication terminal only supports a mobile user identification card, network identities that stand for mobility can be added into the EPLMN list.

S103: A communication connection between the mobile communication terminal and a matching PLMN is established if the matching PLMN is found to match a network identity in the EPLMN list.

In the embodiment of the present disclosure, the mobile communication terminal scans and extracts the network identity of the PLMN broadcasted by the base station. The mobile communication terminal compares the network identity of the PLMN scanned and extracted with the network identities of the PLMNs in the EPLMN list for a match. If there is a match, a communication connection between the mobile communication terminal and the matching PLMN will be established.

As shown in FIG. 1, the embodiment of the present disclosure determines the standard supported by the mobile communication terminal, and adds the network identity of the determined standard PLMN supported by the mobile communication terminal into the EPLMN list. When a PLMN is found to match a network identity in the EPLMN list, a communication connection between the mobile communication terminal and the matching PLMN is established. The embodiment of the present disclosure adds the network identity of the determined standard PLMN supported by the mobile communication terminal into the EPLMN list. The EPLMN list stores network identities of PLMNs that are regarded as equivalent to a certain extent by the mobile communication terminal. Therefore, when the mobile communication terminal connects to a network based on the EPLMN list, which has stored network identities of standard PLMNs supported by the mobile communication terminal, the mobile communication terminal searches networks based on the current location when the mobile communication terminal is inserted with a user identification card for the first time. Thus it significantly heightens the chance of finding a PLMN whose network identity matches a network identity that is already stored in the EPLMN list during the process of network searching, as well as the possibility of the mobile communication terminal accessing to a network at the current location. It is instrumental in minimizing the waiting time when users are communicating (ideally, it only takes a few seconds for the mobile communication terminal to complete network connection), and thus is instrumental in greatly improving users' communication experience.

Figure 2:
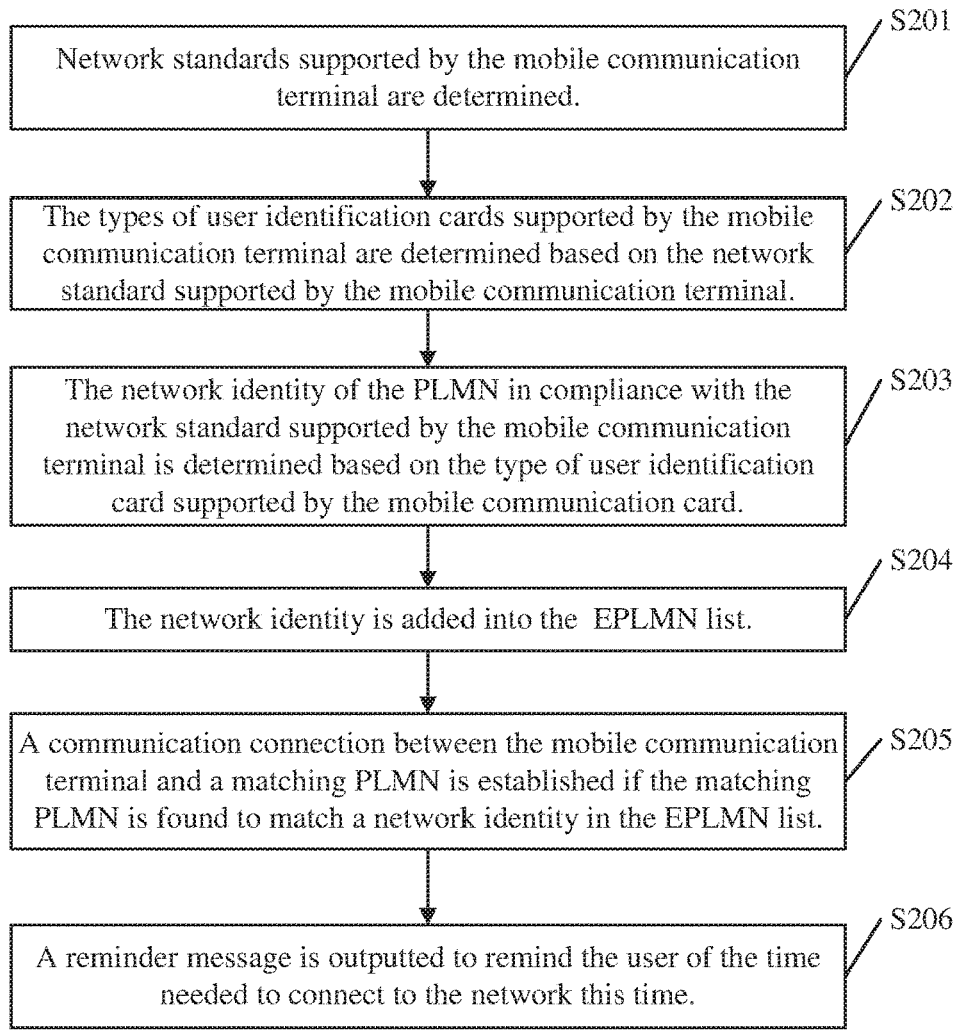
FIG. 2 is a flow chart of a method for accessing to a network according to another embodiment of the present disclosure.

Please refer to FIG. 2. FIG. 2 is a flow chart of the method for accessing to a network according to another embodiment of the present disclosure. The method for accessing to a network includes following blocks:

S201: Network standards supported by the mobile communication terminal are determined.

In the embodiment of the present disclosure, network standards refer to the types of the networks. Types of network standards commonly seen in China are code division multiple access (CDMA), with mobile phones using CDMA 1× at frequency band 800 MHz; global system for mobile communication (GSM), with mobile phones using frequency bands 900/1800/1900 MHZ; GSM 1× dual-mode (i.e. wideband CDMA, WCDMA) in the recent years, taking frequency bands 900/1800 HMZ; 3G mobile communication technology, taking frequency bands 900/1800/1900/2100 HMZ; and 4G technology, taking frequency bands 1920-2170 MHZ.

In the embodiment of the present disclosure, the network standards that can be supported by each mobile communication terminal are limited and definite. That is, after a mobile communication terminal is produced, the network standards supported by the mobile communication terminal are determined.

S202: The types of user identification cards supported by the mobile communication terminal are determined based on the network standard supported by the mobile communication terminal.

In the embodiment of the present disclosure, the user identification card can be a subscriber identity module (SIM) card. When the network standard that can be supported by the mobile communication terminal is determined, the type of user identification card that can be supported by the mobile communication terminal is determined.

S203: The network identity of the PLMN in compliance with the network standard supported by the mobile communication terminal is determined based on the type of user identification card supported by the mobile communication card.

In the embodiment of the present disclosure, Public Land Mobile Network (PLMN) is a network built and operated by the government or operators approved by the government for the purpose of providing land-bound mobile communication services to the public. The network is usually connected to PSTN, forming a communication network that covers a whole region or country. For example, the network identity of PLMN of China Mobile is 46000, and the network identity of China Unicorn is 46001. PLMN is a wireless communication system, inclined to be accessed by land-bound users riding on transportation tools or moving on foot. Such a system can be independent, but it is usually connected to a landline telephone system, such as PSTN. However, there are also more and more mobile and portable Internet users. An ideal PLMN system provides services to mobile and portable users equivalent to that provides to landline users. It can be especially challenging in areas with complicated terrains, because it is difficult to find and maintain a base station. There are also many obstacles in an urban environment, such as noises and interfering radiation that can be evoked by buildings and radio frequencies.

In the embodiment of the present disclosure, the network identity of the PLMN can include network codes. For example, the network codes of China Mobile include: 46000, 46002, 46007, and 46008. The network codes of China Unicorn include: 46001, 46006 and 46009.

S204: The network identity is added into the equivalent public land mobile network (EPLMN) list.

In the embodiment of the present disclosure, an EPLMN is a PLMN that has the same status and level of priority as the PLMN currently chosen by the user's terminal. The EPLMN mainly solves problems related to user retention and roaming strategy in shared networks and original networks. Operators can deploy equivalent PLMNs so to realize sharing of communication network resources. From a business perspective, the practice realizes sharing of communication network resources among different PLMNs defined by the same operator or PLMNs of different operators.

Specifically, when the mobile communication terminal determines the network standard that can be supported by it, the network identity of the PLMN in compliance with the network standard can be added into the EPLMN list. For example, when the mobile communication terminal only supports a mobile user identification card, network identities that stand for mobility can be added into the EPLMN list.

S205: A communication connection between the mobile communication terminal and a matching PLMN is established if the matching PLMN is found to match a network identity in the EPLMN list.

In the embodiment of the present disclosure, the mobile communication terminal scans and extracts the network identity of the PLMN broadcasted by the base station. The mobile communication terminal compares the network identity of the PLMN scanned and extracted with the network identities of the PLMNs in the EPLMN list for a match. If there is a match, a communication connection between the mobile communication terminal and the matching PLMN will be established.

In the embodiment of the present disclosure, operators broadcast the network identities of their own PLMNs, so that each mobile communication terminals can scan and extract these network identities.

S206: A reminder message is outputted to remind the user of the time needed to connect to the network this time.

As an optional method of implementation, if the mobile communication terminal detects a match between the network identity of the PLMN scanned and extracted and the network identities of PLMNs in the EPLMN list, it implies that the search of network is successful. Then, a request for connection can be sent to the network so to establish a connection. For users or testers to better understand the details of the connection to the network this time, a reminder message can be outputted to remind the user of the time needed to connect to the network this time.

As another optional method of implementation, if there is no match between the network identity of the PLMN scanned and extracted and the network identities of PLMNs in the EPLMN list, it implies that accessing to the network fails this time. The mobile communication terminal can detect reasons of the failure and remind users how to update the EPLMN list.

FIG. 2 illustrates in detail how the mobile communication terminal determines the network identity of the PLMN in compliance with the network standard supported by the mobile communication terminal based on the type of user identification card, adds the network identity into the EPLMN list, and connects to the network based on the EPLMN list. It reminds the user of the time needed to connect to the network when the connection succeeds, and reminds the user of the reasons of failure when the connection fails. The embodiment of the present disclosure not only reduces the time needed to connect to the network in advance, but also sends a reminder message when accessing to the network is completed. It can elevate user experience as well.

Figure 3:
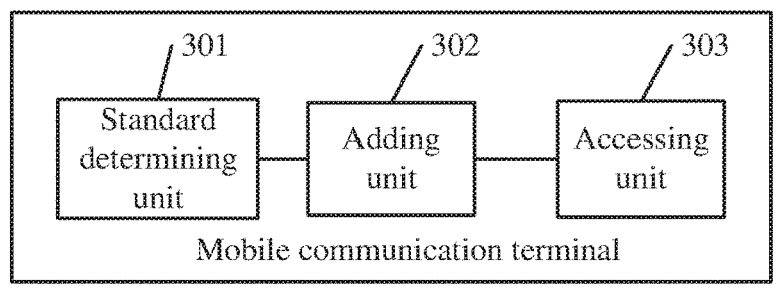
FIG. 3 is a block diagram of a mobile communication terminal according to a first embodiment of the present disclosure.

Please refer to FIG. 3. FIG. 3 is a block diagram of a mobile communication terminal according to a first embodiment of the present disclosure. As shown in FIG. 3, the mobile communication terminal can include a standard determining unit 301, an adding unit 302, and an accessing unit 303.

The standard determining unit 301 is used to determine the network standards supported by the mobile communication terminal.

In the embodiment of the present disclosure, network standards refer to the types of the networks. Types of network standards commonly seen in China are code division multiple access (CDMA), with mobile phones using CDMA 1× at frequency band 800 MHz; global system for mobile communication (GSM), with mobile phones using frequency bands 900/1800/1900 MHZ; GSM 1× dual-mode (i.e. wideband CDMA, WCDMA) in the recent years, taking frequency bands 900/1800 HMZ; 3G mobile communication technology, taking frequency bands 900/1800/1900/2100 HMZ; and 4G technology, taking frequency bands 1920-2170 MHZ.

In the embodiment of the present disclosure, the network standards that can be supported by each mobile communication terminal are limited and definite. That is, after a mobile communication terminal is produced, the network standards supported by the mobile communication terminal are determined.

The adding unit 302 is used to add network identities of the PLMN in compliance with the network standards supported by the mobile communication terminal determined by the standard determining unit 301 into the EPLMN list.

In the embodiment of the present disclosure, Public Land Mobile Network (PLMN) is a network built and operated by the government or operators approved by the government for the purpose of providing land-bound mobile communication services to the public. The network is usually connected to PSTN, forming a communication network that covers a whole region or country. For example, the network identity of PLMN of China Mobile is 46000, and the network identity of China Unicom is 46001. PLMN is a wireless communication system, inclined to be accessed by land-bound users riding on transportation tools or moving on foot. Such a system can be independent, but it is usually connected to a landline telephone system, such as PSTN. However, there are also more and more mobile and portable Internet users. An ideal PLMN system provides services to mobile and portable users equivalent to that provides to landline users. It can be especially challenging in areas with complicated terrains, because it is difficult to find and maintain a base station. There are also many obstacles in an urban environment, such as noises and interfering radiation that can be evoked by buildings and radio frequencies.

In the embodiment of the present disclosure, an EPLMN is a PLMN that has the same status and level of priority as the PLMN currently chosen by the user's terminal. The EPLMN mainly solves problems related to user retention and roaming strategy in shared networks and original networks. Operators can deploy equivalent PLMNs so to realize sharing of communication network resources. From a business perspective, the practice realizes sharing of communication network resources among different PLMNs defined by the same operator or PLMNs of different operators.

In the embodiment of the present disclosure, the network identity of the PLMN can include network codes. For example, the network codes of China Mobile include: 46000, 46002, 46007, and 46008. The network codes of China Unicorn include: 46001, 46006 and 46009.

Specifically, when the standard determining unit 301 determines the network standard that can be supported by it, the network identity of the PLMN in compliance with the network standard can be added into the EPLMN list. For example, when the mobile communication terminal only supports a mobile user identification card, network identities that stand for mobility can be added into the EPLMN list.

The accessing unit 303 is used to establish a communication connection between the mobile communication terminal and a matching PLMN if the matching PLMN is found to match a network identity in the EPLMN list.

The accessing unit 303 is used to scan and extract the network identities of PLMN broadcasted by base stations. The accessing unit 303 is also used to compare the network identities of the PLMNs scanned and extracted with the network identities of the PLMNs in the EPLMN list for a match. The accessing unit 303 is further used to establish a communication connection between the mobile communication terminal and the matching PLMN.

As shown in FIG. 3, the standard determining unit 301 determines the standard supported by the mobile communication terminal. The adding unit 302 adds the network identity of the determined standard PLMN supported by the mobile communication terminal into the EPLMN list. When a PLMN is found to match a network identity in the EPLMN list, the accessing unit 303 establishes a communication connection between the mobile communication terminal and the matching PLMN. The accessing unit 302 adds the network identity of the determined standard PLMN supported by the mobile communication terminal into the EPLMN list. The EPLMN list stores network identities of PLMNs that are regarded as equivalent to a certain extent by the mobile communication terminal. Therefore, when the mobile communication terminal connects to a network based on the EPLMN list, which has stored network identities of standard PLMNs supported by the mobile communication terminal, it searches networks based on the current location when it is inserted with a user identification card for the first time. Thus it significantly heightens the chance of finding a PLMN whose network identity matches a network identity that is already stored in the EPLMN list during the process of network searching, as well as the possibility of the mobile communication terminal accessing to a network at the current location. It is instrumental in minimizing the waiting time when users are communicating (ideally, it only takes a few seconds for the mobile communication terminal to complete network connection), and thus is instrumental in greatly improving users' communication experience.

Figure 4:
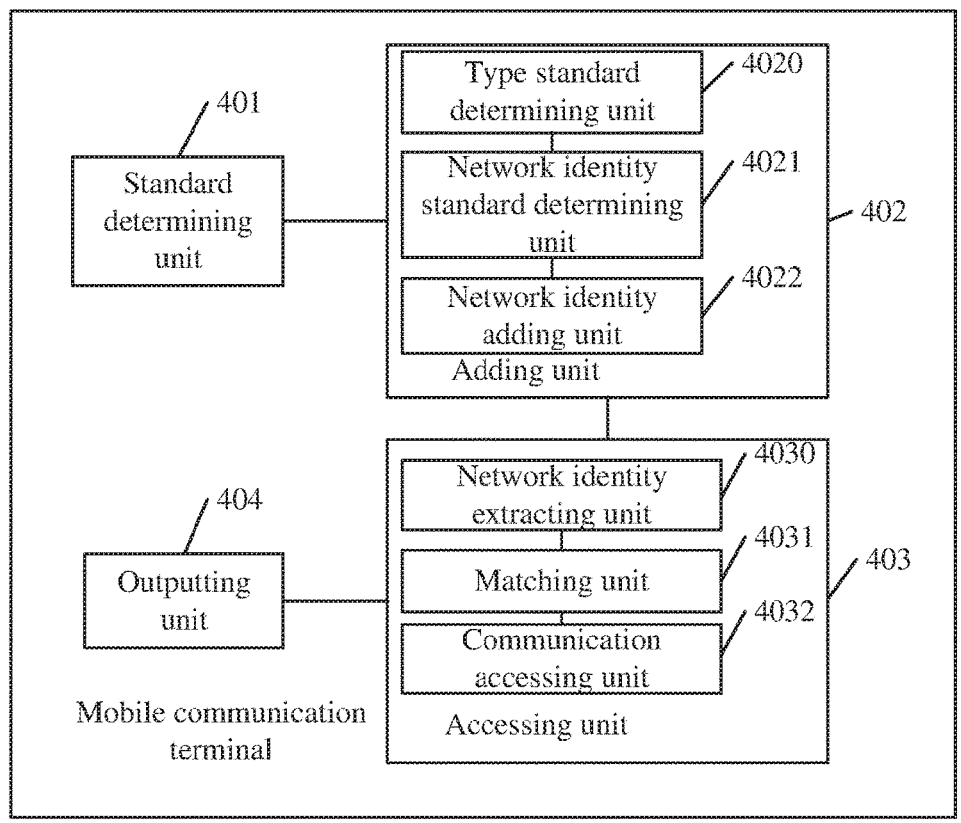
FIG. 4 is a block diagram of a mobile communication terminal according to a second embodiment of the present disclosure.

Please refer to FIG. 4. FIG. 4 is a block diagram of a mobile communication terminal according to a second embodiment of the present disclosure. As shown in FIG. 4, the mobile communication terminal can include a standard determining unit 401, an adding unit 402, an accessing unit 403 and an outputting unit 404. The adding unit 402 can include a type standard determining unit 4020, a network identity standard determining unit 4021 and a network identity adding unit 4022. The accessing unit 403 can include a network identity extracting unit 4030, a matching unit 4031 and a communication accessing unit 4032.

The standard determining unit 401 is used to determine the network standards supported by the mobile communication terminal.

In the embodiment of the present disclosure, network standards refer to the types of the networks. Types of network standards commonly seen in China are code division multiple access (CDMA), with mobile phones using CDMA 1× at frequency band 800 MHz; global system for mobile communication (GSM), with mobile phones using frequency bands 900/1800/1900 MHZ; GSM 1× dual-mode (i.e. wideband CDMA, WCDMA) in the recent years, taking frequency bands 900/1800 HMZ; 3G mobile communication technology, taking frequency bands 900/1800/1900/2100 HMZ; and 4G technology, taking frequency bands 1920-2170 MHZ.

In the embodiment of the present disclosure, the network standards that can be supported by each mobile communication terminal are limited and definite. That is, after a mobile communication terminal is produced, the network standards it can support is determined.

The type standard determining unit 4020 is used to determine the types of user identification cards supported by the mobile communication terminal based on the types of network standards supported by the mobile communication terminal.

In the embodiment of the present disclosure, the user identification card can be a subscriber identity module (SIM) card. When the network standards that can be supported by the mobile communication terminal are determined, the types of user identification cards that can be supported by the mobile communication terminal are determined.

The network identity standard determining unit 4021 is used to determine the network identity of the PLMN in compliance with the network standard supported by the mobile communication terminal based on the type of user identification card supported by the mobile communication terminal determined by the type standard determining unit 4020.

In the embodiment of the present disclosure, Public Land Mobile Network (PLMN) is a network built and operated by the government or operators approved by the government for the purpose of providing land-bound mobile communication services to the public. The network is usually connected to PSTN, forming a communication network that covers a whole region or country. For example, the network identity of PLMN of China Mobile is 46000, and the network identity of China Unicom is 46001. PLMN is a wireless communication system, inclined to be accessed by land-bound users riding on transportation tools or moving on foot. Such a system can be independent, but it is usually connected to a landline telephone system, such as PSTN. However, there are also more and more mobile and portable Internet users. An ideal PLMN system provides services to mobile and portable users equivalent to that provides to landline users. It can be especially challenging in areas with complicated terrains, because it is difficult to find and maintain a base station. There are also many obstacles in an urban environment, such as noises and interfering radiation that can be evoked by buildings and radio frequencies.

In the embodiment of the present disclosure, the network identity of the PLMN can include network codes. For example, the network codes of China Mobile include: 46000, 46002, 46007, and 46008. The network codes of China Unicorn include: 46001, 46006 and 46009.

The network identity adding unit 4022 is used to add the network identities determined by the network identity standard determining unit 4021 into the EPLMN list.

In the embodiment of the present disclosure, an EPLMN is a PLMN that has the same status and level of priority as the PLMN currently chosen by the user's terminal. The EPLMN mainly solves problems related to user retention and roaming strategy in shared networks and original networks. Operators can deploy equivalent PLMNs so to realize sharing of communication network resources. From a business perspective, the practice realizes sharing of communication network resources among different PLMNs defined by the same operator or PLMNs of different operators.

Specifically, when the standard determining unit 401 determines the network standard that can be supported by it, the network identity of the PLMN in compliance with the network standard can be added into the EPLMN list. For example, when the mobile communication terminal only supports a mobile user identification card, network identities that stand for mobility can be added into the EPLMN list.

The network identity extracting unit 4030 is used to scan and extract the network identities of PLMN broadcasted by base stations.

In the embodiment of the present disclosure, operators broadcast the network identities of their own PLMNs, so that each mobile communication terminals can scan and extract these network identities.

The matching unit 4031 is used to compare the network identities of the PLMNs scanned and extracted by the network identity extracting unit 4030 with the network identities of the PLMNs in the EPLMN list for a match.

In the embodiment of the present disclosure, when the network identity extracting unit 4030 scans and extracts the network identities of PLMN, the matching unit 4031 is used to compare the network identities of the PLMNs scanned and extracted by the network identity extracting unit 4030 with the network identities of the PLMNs in the EPLMN list for a match.

The communication accessing unit 4032 is used to establish a communication connection between the mobile communication terminal and the matching PLMN when the matching unit 4031 finds a match.

The outputting unit 404 is used to output a reminder message reminding users of the time needed to connect to the network this time.

As an optional method of implementation, if the mobile communication terminal detects a match between the network identity of the PLMN scanned and extracted and the network identities of PLMNs in the EPLMN list, it implies that the search of network is successful. Then, a request for connection can be sent to the network so to establish a connection. For users or testers to better understand the details of the connection to the network this time, a reminder message can be outputted to remind the user of the time needed to connect to the network this time.

As another optional method of implementation, if there is no match between the network identity of the PLMN scanned and extracted and the network identities of PLMNs in the EPLMN list, it implies that accessing to the network fails this time. The mobile communication terminal can detect reasons of the failure and remind users how to update the EPLMN list.

FIG. 4 illustrates in detail how the mobile communication terminal determines the network identity of the PLMN in compliance with the network standard supported by the mobile communication terminal based on the type of user identification card, adds the network identity into the EPLMN list, and connects to the network based on the EPLMN list. It reminds the user of the time needed to connect to the network when the connection succeeds, and reminds the user of the reasons of failure when the connection fails. The embodiment of the present disclosure not only reduces the time needed to connect to the network in advance, but also sends a reminder message when accessing to the network is completed. It can elevate user experience as well.

Figure 5:
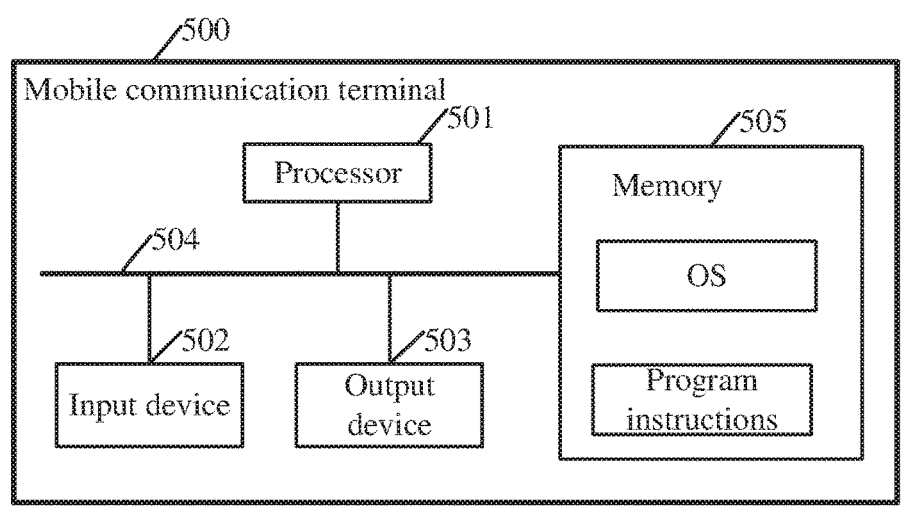
FIG. 5 is a block diagram of a mobile communication terminal according to a third embodiment of the present disclosure.

FIG. 5 is a schematic diagram of a structure of still another mobile communication terminal according to one embodiment of the present disclosure. The mobile communication terminal is configured to perform the above network access methods. A mobile communication terminal 500 may include: elements such as at least one processor 501, at least one input device 502, at least one output device 503, a memory 505. These elements are communicatively connected through one or a plurality of buses 504 Those of ordinary skill in the art would understand that the embodiment of the present disclosure is not limited to the structure of the mobile communication terminal shown in FIG. 5. It may be either a bus-type structure or a star-type structure, or may include more or fewer elements than illustrated, or some elements may be combined, or the elements may be arranged differently. The processor 501 is a control center of the mobile communication terminal 500. The processor 501 is connected to various parts of the mobile communication terminal 500 by utilizing various interfaces and circuits. Through running or executing program instructions and/or modules stored in the memory 505, and using data stored in the memory 505, the processor 501 performs a variety of functions of the mobile communication terminal and processes data. The processor 501 may be constituted by an integrated circuit (IC), for example, it may be formed by a single packaged IC, or may be formed by connecting a plurality of packaged ICs having a same function or different functions. For example, the processor 501 may only include a central processing unit (CPU), or may be a combination of a CPU, a digital signal processor (DSP), a graphic processing unit (GPU), and various types of control chips. In the embodiment of the present disclosure, the CPU may be a single-core CPU or may include a multi-core CPU.

The input device 502 includes a standard touch panel, a standard keyboard, etc., and may also include a wired interface, a wireless interface, etc.

The output device 503 includes a display panel, a speaker, etc., and may also include a wired interface, a wireless interface, etc.

The memory 505 may be configured to store a software program and the module. The processor 501, the input device 502, and the output device 503 performs a variety of functional applications of the mobile communication terminal and achieve data processing through using the software program and the module stored in the memory 505. The memory 505 mainly includes a program storage area and a data storage area. The program storage area may store an operating system, an application program required by at least one function, or the like. The data storage area may store data or the like created according to uses of the mobile communication terminal. In the embodiment of the present disclosure, the operating system may be an Android system, an iOS system, a Windows operating system, or the like.

Specifically, the processor 501 executes the program instructions stored in the memory 505 to perform the following operations:

determining a network standard supported by the mobile communication terminal;

adding a network identity of a public land mobile networks (PLMN) in compliance with the determined network standard supported by the mobile communication terminal to an equivalent public land mobile network (EPLMN) list; and establishing a communication connection between the mobile communication terminal and a matching PLMN upon a condition that the matching PLMN is found to match the network identity in the EPLMN list.

In the embodiment of the present disclosure, the network identity includes a network code.

In the embodiment of the present disclosure, when the processor 501 executes the program instructions to add a network identity of a public land mobile networks (PLMN) in compliance with the determined network standard supported by the mobile communication terminal to an equivalent public land mobile network (EPLMN) list, the processor 501 executes the program instructions to perform following operations:

detecting a type of user identification card supported by the mobile communication terminal based on the network standard supported by the mobile communication terminal;

determining the network identity of PLMN in compliance with the network standard supported by the mobile communication terminal based on the type of user identification card;

adding the network identity to the EPLMN list.

In the embodiment of the present disclosure, when the processor 501 executes the program instructions to establish the communication connection between the mobile communication terminal 500 and a matching PLMN upon a condition that the matching PLMN is found to match the network identity in the EPLMN list, the processor 501 executes the program instructions to perform following operations:

scanning network identities of PLMNs broadcasted by a base station;

comparing the scanned network identities of the PLMNs with the network identity of PLMN in the EPLMN list;

establishing, upon a condition that one of the scanned network identities matches the network identity of PLMN in the EPLMN list, the communication connection between the mobile communication terminal and the matching PLMN.

In the embodiment of the present disclosure, the processor 501 executes the program instructions to perform a following operation:

outputting a reminder message to remind the user of a time needed to connect to the network this time.

Specifically, the embodiment of the present disclosure introduces a terminal that can implement part or all of the procedure of the method for accessing to a network introduced by the present disclosure in combined with FIG. 1

All the modules or submodules of the embodiments of the present disclosure can be realized by general integrated circuits, such as central processing unit (CPU) or application specific integrated circuit (ASIC).

The blocks of the embodiments of the present disclosure can be adjusted, combined or deleted based on real needs.

The units of the terminal in the embodiments of the present disclosure can be combined, divided or deleted based on real needs.

An ordinary technician of this field understands that part or all of the procedure of the embodiments can be completed by commanding relevant hardware through computer programs. The program can be stored in a computer readable storage medium. Procedures of the embodiments of the methods can be included when the program is operating. Wherein the storage medium can be a disk, CD, read-only memory (ROM), or random access memory (RAM).

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A method for accessing to a network, characterized in that the method comprises:

determining a network standard supported by a mobile communication terminal;

determining a type of user identification card supported by the mobile communication terminal based on the network standard supported by the mobile communication terminal;

determining a network identity of PLMN in compliance with the network standard supported by the mobile communication terminal based on the type of user identification card being supported;

adding the network identity to an equivalent public land mobile network (EPLMN) list; the EPLMN list being configured to solve problems related to user retention and roaming strategy in shared networks and original networks and being disposed in the mobile communication terminal in advance rather than the user identification card, the EPLMN list comprising equivalent PLMNs deployed by operators, the equivalent PLMNs realizing sharing of communication network resources;

scanning network identities of PLMNs broadcasted by a base station when the user identification card is inserted into the mobile communication terminal for the first time;

comparing the scanned network identities of the PLMNs with the network identity of PLMN in the EPLMN list;

establishing a communication connection between the mobile communication terminal and a matching PLMN upon a condition that the matching PLMN is found to match the network identity in the EPLMN list, and outputting a reminder message configured to remind a user of a time needed to connect to the network this time;

outputting a reminder message to remind the user of network access failure and reasons of failure upon a condition that there is no matching PLMN to match the network identity in the EPLM list.

2. The method of claim 1, wherein the network identity comprises a network code.

3. A mobile communication terminal, characterized in that the mobile communication terminal comprises: a memory and a processor, the memory storing one or more computer programs that, when executed by the processor, cause the processor to execute operations comprising:

determining a network standard supported by the mobile communication terminal;

determining a type of user identification card supported by the mobile communication terminal based on the network standard supported by the mobile communication terminal;

determining a network identity of PLMN in compliance with the network standard supported by the mobile communication terminal based on the type of user identification card supported by the mobile communication terminal;

adding the network identity of PLMN in compliance with the network standard supported by the mobile communication terminal to an equivalent public land mobile network (EPLMN) list; the EPLMN list being disposed in the mobile communication terminal in advance rather than the user identification card and configured to solve problems related to user retention and roaming strategy in shared networks and original networks, the EPLMN list comprising equivalent PLMNs deployed by operators, the equivalent PLMNs realizing sharing of communication network resources;

scanning network identities of PLMNs broadcasted by a base station;

comparing the network identities of the PLMNs with the network identity of the PLMN in the EPLMN list;

establishing, upon a condition that one of the scanned network identities matches the network identity of PLMN in the EPLMN list, a communication connection between the mobile communication terminal and the matching PLMN;

outputting a reminder message to remind a user of a time needed to connect to the network this time upon a condition that the communication connection between the mobile communication terminal and the matching PLMN is achieved; and outputting a reminder message to remind the user of network access failure and reasons of failure upon a condition that there is no matching PLMN to match the network identity in the EPLM list.

4. The mobile communication terminal of claim 3, wherein the network identity comprises a network code.

* * * * *